United States Patent [19]

Lee et al.

[11] Patent Number: 5,613,085
[45] Date of Patent: Mar. 18, 1997

[54] SYSTEM FOR PARALLEL STRIPING OF MULTIPLE ORDERED DATA STRINGS ONTO A MULTI-UNIT DASD ARRAY FOR IMPROVED READ AND WRITE PARALLELISM

[75] Inventors: Paul K.-W. Lee, San Jose, Calif.; Zvi Y. Yehudai, Haifa, Israel

[73] Assignee: International Business Machines Corporation, Armonk, N.Y.

[21] Appl. No.: 364,572

[22] Filed: Dec. 27, 1994

[51] Int. Cl.⁶ .................................................. G06F 12/06
[52] U.S. Cl. ............................................................. 395/441
[58] Field of Search ................................... 395/439, 441, 395/182.04

[56] References Cited

U.S. PATENT DOCUMENTS

| | | | |
|---|---|---|---|
| 5,208,813 | 5/1993 | Stallmo | 395/182.05 |
| 5,220,653 | 6/1993 | Miro | 395/826 |
| 5,257,362 | 10/1993 | Menon | 395/441 |
| 5,258,984 | 11/1993 | Menon et al. | 395/182.05 |
| 5,263,145 | 11/1993 | Brady et al. | 395/441 |
| 5,265,098 | 11/1993 | Mattson et al. | 395/182.04 |
| 5,301,297 | 4/1994 | Menon et al. | 395/441 |
| 5,331,646 | 7/1994 | Krueger et al. | 371/40.1 |
| 5,351,246 | 9/1994 | Blaum et al. | 395/182.04 |
| 5,459,853 | 10/1995 | Best et al. | 395/441 |

*Primary Examiner*—Eddie P. Chan
*Assistant Examiner*—Kevin L. Ellis
*Attorney, Agent, or Firm*—Baker, Maxham, Jester & Meador

[57] ABSTRACT

A system for storing sortwork data in a storage subsystem to maximize parallelism during subsequent merging operations. One implementation of the invention employs a computing system with a sort/merge application module and a storage subsystem such as a RAID arrangement. Each DASD unit preferably includes multiple disks in a vertically-stacked array, and each disk is configured with at least one track. Each disk corresponds to one disk of each of the other DASD units. A group of identically-sized locations from identically-positioned tracks of corresponding disks from each DASD unit forms. And, the aggregate of all identically-positioned tracks from all disks in all DASD units makes up a logical array cylinder. To perform sorting and merging operations in accordance with the invention, the sort/merge application module first internally sorts a data packet to generate a string. The string is then stored in the storage subsystem, with a particular storage scheme that maximizes the parallelism of subsequent merge operations. Specifically, the string is stored such that, after all strings have been stored, each string will be evenly striped across disks of all DASD units after all data has been sorted and stored in the disk storage subsystem. Striping is most advantageously made in a diagonal pattern with wraparound. Moreover, string size permitting, striping is preferably confined to a single logical array cylinder to minimize actuator movement in reading and writing to the disks. Storage is accomplished such that each logical block contains one string-block from each string, and each string-block within a logical block has the same order relative to its string as the other string-blocks to their corresponding strings.

38 Claims, 6 Drawing Sheets

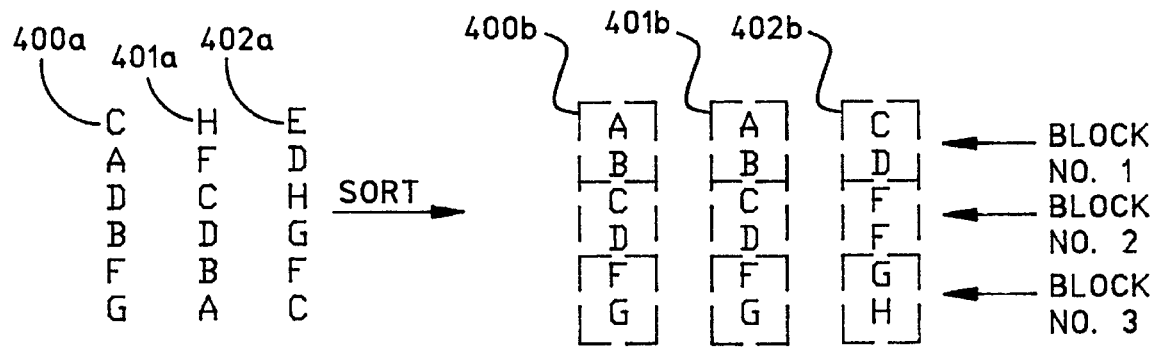
FIG. 4A (Prior Art)
FIG. 4B (Prior Art)
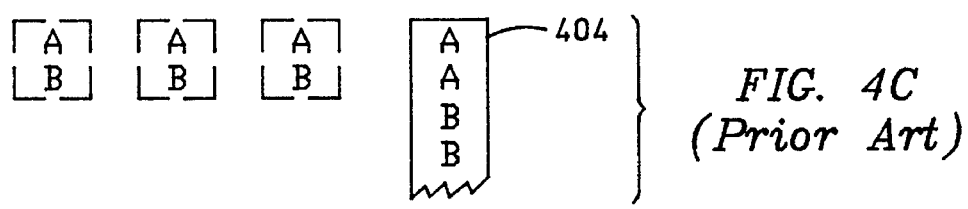
FIG. 4C (Prior Art)
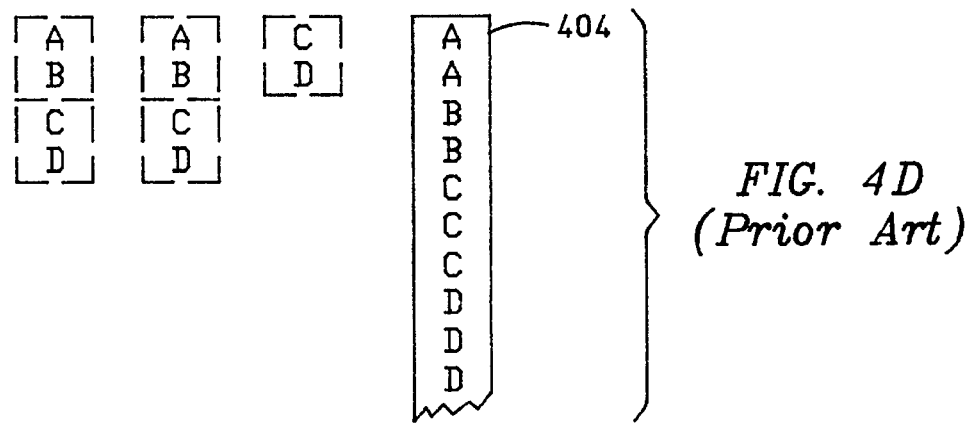
FIG. 4D (Prior Art)

SYSTEM FOR PARALLEL STRIPING OF MULTIPLE ORDERED DATA STRINGS ONTO A MULTI-UNIT DASD ARRAY FOR IMPROVED READ AND WRITE PARALLELISM

BACKGROUND OF THE INVENTION

1. Field of the Invention

The present invention generally relates to disk array systems. More particularly, the invention concerns a system for distributing sortwork data onto a disk array system using parallel read and write commands. The distribution scheme of the invention is particularly useful in conjunction with external sorting operations.

2. Description of the Related Art

CYCLIC TRACK DATA RECORDING MEDIA

As shown in FIG. 1, a cyclic track data recording medium is used in a media drive in which an actuator 100 positions a read/write head 101 to magnetically read and write data stored on a surface 103 of a rapidly spinning, constant speed disk 102. To access one of many circular, concentric "tracks" 104 of data on the surface 103, the actuator 100 is moved to a desired position 106, defined by some angular position ($\theta$). Rotational position of the disk 102 may be ascertained by detecting passage of an index mark (not shown) imprinted on the disk 102. A specific item of data on the desired track 104 may be located, then, by detecting the angular position of the actuator 102 and the rotational position of the disk 102.

The media drive, as typified in FIG. 1, may comprise, for example, a Direct Access Storage Device, or "DASD". Access to data through a DASD is said to be "direct", since a specific item of data can be directly retrieved by moving the actuator 100 to the desired track 104 and waiting for the correct rotational position of the disk 102.

DASD ARRAYS

A DASD "array" is any physical arrangement of DASDs, where selective ones (or all) of the DASDs can be accessed concurrently. By coupling multiple cyclic recording media to create a DASD array, a larger memory can be created without changing the memory capacity of each disk. A typical stacked DASD array 200 (FIG. 2) employs multiple actuators 202 to interface with multiple stacked disks 204 mounted on a spindle 206. All actuators 202 on a DASD array 200 have the same angular position at any one time. However, only one actuator's read/write head may be active at any one time. The position of data on a stacked DASD array can be described with reference to its "cylinder number", which is a reference to a stack of tracks at one actuator position.

REDUNDANT ARRAY OF INEXPENSIVE DISKS ("RAID")

In contrast to the typical DASD array 200, DASDs are sometimes arranged in a Redundant Array of Inexpensive Disks ("RAID"). RAID architectures are well-known in the art. Reference is given, for example, to the descriptions of RAID architecture in U.S. Pat. No. 5,301,297, commonly assigned with this application and incorporated herein in its entirety. A typical RAID architecture is shown in FIG. 3. A RAID device 300 contains multiple simple DASD units 302, often arranged according to rows 304 and columns 306.

With RAID architecture, each DASD unit 302 may contain a single disk (as in FIG. 3) or even a stacked DASD array. All disks in a RAID typically have the same size and rate of rotation. Although the angular position is common among all actuators in a DASD unit, the actuators of different DASD units in a RAID may vary in angular position with respect to each other. One of the chief advantages of RAID devices is that they provide more efficiency for large memory requests, as well as numerically complex operations.

For example, sub-parts of a file, called "blocks", can be spread across multiple DASD units 302, each DASD unit 302 being simultaneously accessible. Distribution of data blocks in this manner is called "striping." By accessing multiple DASD units 302 simultaneously, a user can achieve a high level of "parallelism", and hence more efficient use of the RAID device. In comparison to conventional DASD arrays, such as computer "hard-drives", RAID systems also offer the advantage of reduced expense, since the DASD units 302 of a RAID device may be smaller and less complicated to manufacture.

A number of RAID architectures are well known, such as RAID-1, RAID-2, RAID-3, RAID-4, and RAID-5 arrangements. In the "RAID-5" architecture, efficiency and reliability of RAID operations is increased by designating a "parity" disk and a "spare" disk. Specifically, RAID-5 employs eight data disks, one parity disk, and one spare disk. If a disk fails in this arrangement, the parity disk may be used to reconstruct lost data on the spare disk using a Boolean function such as exclusive-or ("XOR").

For purposes of organization and efficiency, computer designers often require their RAID systems to emulate a single contiguous stacked DASD array. This may be difficult since the number, size, and capacity of the DASDs in the RAID may differ substantially from the DASD to be emulated. In confronting this problem, engineers design computer hardware and software to map the data stored in an actual, physical RAID device onto an imaginary or "logical" device to be emulated. To carry out this emulation, for example, the RAID data is mapped onto "logical" tracks and "logical" cylinders of the logical device.

SORTING OPERATIONS

Computer engineers have used DASDs for a variety of applications. One useful popular application, for instance, is "sorting." Sorting generally involves rearranging data according to one or more key values, in some sequential order, typically ascending or descending. There are basically two types of sorting operations: internal and external.

With internal sorting, the data to be sorted is smaller than the computer's main memory, permitting the data to completely fit in main memory. Thus, the data can be read into memory and sorted at one time. Some known examples of internal sorting are the Radix, Quicksoft, and Replacement-Selection methods.

With external sorting, the size of the data to be sorted is larger than the main memory size. Therefore, the data cannot be simply read into main memory and sorted. Instead, the sorting task is performed in two phases—a string generation phase, then a merging phase. An example of an external sort is shown in FIGS. 4A–4D. First, in the string generation phase, a jumbled group of data (data "packets") 400a–402a are received (FIG. 4A). In the present example, there are three data packets. Using an internal sorting procedure, each data packet 400a–402a is separately re-arranged to create sorted data strings 400b–402b (FIG. 4B). These sorted data strings 400b–402b are called "sortwork".

In the output merge phase, the sorted strings 400b–402b are combined to yield a final output that has been completely sorted and merged. In particular, the sorted data strings 400b–402b are divided into string-blocks, and a series of "passes" are made by successively opening string-blocks of the strings and comparing the contents. For example, the first string-block of each data string 400b–402b is first opened, and the contents compared. During this comparison, the highest priority data of the string-blocks are written to a final output 404 (FIG. 4C). As shown in FIGS. 4C–4D, string-blocks are sequentially opened in multiple passes, as more and more blocks are effectively plucked from their data strings and inserted into the final output 404.

FIG. 5 depicts an representative hardware architecture used in sorting operations. Typically, sorting is managed by a sort/merge application module 502 of a computer system 503. The module 502 may comprise a computer program stored in a computer storage subsystem (not shown). The architecture also includes primary and temporary storage devices 504–505, each of which may comprise a DASD. The primary storage device 504 is generally used to store the original data to be sorted, as well as the final, merged output. The temporary storage device 505 is used to store intermediate data, such as sortwork, used in sorting and merging. The subsystem may also include other devices (not shown), such as a data storage area, device controllers, and the like. Communications between the computer system 502 and the storage devices 504–505 are actively managed by I/O channels 506–507.

The first step in the sorting process is the string generation phase. After the module 502 reads the data packets to be sorted from the primary storage device 504, the module 502 sorts each data packet and re-stores the sorted strings in the temporary storage device 505. After the string generation phase, portions of each sorted string are sequentially re-read by the module 502 and then merged to create a final sorted output. Last, the final sorted output is stored in the primary storage device 504.

Sorting operations represent a significant workload in a typical data processing environment. It has been estimated that, on average, sorting applications consume 10–15% of processing resources, and 20–25% of I/O resources. It is therefore important to expedite sorting operations, to increase the overall speed of a computing system. And, since it has been estimated that 85% of the time involved in a sort operation is spent performing I/O functions, expediting sort operations is most effectively performed by decreasing disk access time.

As discussed above, the use of DASDs in a RAID configuration helps to increase sorting speed by providing users with more parallelism during sorting operations. This, however, typically depends on the pattern of data storage in the RAID. If, for example, a single data string is striped across multiple DASD units 302, access to this data string will be highly parallel, and very quick. However, if a part of each string is located on a single DASD unit, and those parts must be accessed for a single operation, there is no parallelism at all. This problem arises chiefly during the merge phase, when parts of different strings are gathered. The following example explores this situation in greater detail.

1. Sort/Merge Example

Table 1 illustrates a typical example of four sorted strings. Each string is made up of four string-blocks. Here, the string-blocks of a string are designated by B(i,j), where i represents the string number and j represents the order of a string-block within a string.

TABLE 1

| string 0 | B(0,0) | B(0,1) | B(0,2) | B(0,3) |
| string 1 | B(1,0) | B(1,1) | B(1,2) | B(1,3) |
| string 2 | B(2,0) | B(2,1) | B(2,2) | B(2,3) |
| string 3 | B(3,0) | B(3,1) | B(3,2) | B(3,3) |

In this example, it is assumed that data is uniformly distributed among all four strings; this means that during the merge phase, one string-block from each string will be needed.

2. Data Distribution Example

The present example employs a four DASD units, each DASD unit including four disks mounted concentrically in a stacked vertical array. A block-sized storage location of a disk is called a disk-block, and in the present example, one disk-block occupies one track. For ease of explanation, each disk contains one track. Thus, the storage capacity of all DASD units combined is 16 blocks, arranged in a 4×4 array.

As mentioned above, the string-blocks of a single string can be interleaved across all four DASD units for maximum parallelism in writing the data. Such a distribution is shown below in Table 2.

TABLE 2

|  | disk-block 0 | disk-block 1 | disk-block 2 | disk-block 3 |
|---|---|---|---|---|
| DASD unit 0 | B(0,0) | B(1,0) | B(2,0) | B(3,0) |
| DASD unit 1 | B(0,1) | B(1,1) | B(2,1) | B(3,1) |
| DASD unit 2 | B(0,2) | B(1,2) | B(2,2) | B(3,2) |
| DASD unit 3 | B(0,3) | B(1,3) | B(2,3) | B(3,3) |

This distribution scheme maintains 4-way parallelism in writing the sorted strings to the RAID during the string generation phase, since each string is striped across all four DASD units. However, this does not guarantee any parallelism in reading back the sortwork string-blocks during the merge phase. If the data is uniformly distributed, then all four strings have the same data distribution: one string-block from each string would be required for each merge pass. In particular, the first merge pass would read string-blocks B(0,0), B(1,0), B(2,0), and B(3,0) into the computer system 503, merge them, and write them to the primary storage device 504 as part of the final output. String-blocks B(0,1), B(1,1), B(2,1), and B(3,1) would be read next, merged, and so on.

Therefore, with the strings distributed across the DASD units as shown above, there is no parallelism in reading the data back from the RAID, since all required string-blocks for each merge pass are distributed within the same DASD unit. And, as mentioned above, only one read/write head in a DASD unit can be active at any one time. Accordingly, an improved string storage scheme is needed to increase parallelism during merge operations.

SUMMARY OF THE INVENTION

The present invention concerns a system for distributing sorted strings onto a storage subsystem using parallel read and write commands. A preferred implementation of the invention employs a computing system with a sort/merge application module and a storage subsystem such as a RAID arrangement, where each DASD unit preferably comprises multiple disks in a standard DASD array. Each DASD unit is sub-divided into a number of disk-blocks corresponding to identically positioned disk-blocks of the other DASD units. A group of identically positioned disk-blocks of the DASD units form a logical block.

The method of the invention proceeds as follows. First, the application module internally sorts a data packet to generate a string. The string is then stored in a temporary storage device, in a manner that is calculated to maximize the parallelism of subsequent merge operations. Specifically, the string is stored such that, after all strings have been stored, each string will be evenly striped across all of the DASD units after all data has been sorted and stored in the storage subsystem. Striping is most advantageously made in a diagonal pattern. Storage is accomplished such that each logical block contains one string-block from each string, and each string-block within a logical block has the same order relative to its string as the other string-blocks have to their corresponding strings.

The invention affords its users with a number of distinct advantages. For instance, the invention achieves a higher data rate in reading and writing to a storage during sorting and merging operations. In particular, the invention systematically stores data in a manner specifically designed to improve parallelism in data access. In addition to improving parallelism, the invention provides more efficient data access by advantageously minimizing the number of logical array cylinders used. This reduces or eliminates the mechanical movement required by the DASD units' actuators. In view of these features, the present invention minimizes any load that the relatively slow I/O speed of a RAID device might place on the relatively faster processor speed of the computer system. Data access during sorting and merging operations can therefore be conducted more efficiently, and hence faster.

Unlike prior arrangements, the present invention may employ a RAID to assist in sorting. This further increases the efficiency and speed of the invention. Users will also benefit from the invention because of its high reliability and serviceability. The invention is reliable and easily serviceable because it may be implemented using a RAID-5 architecture, which includes various features to reconstruct data in the event of disk failure.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein:

FIGS. 4A–4D are diagrams illustrating steps involved in sorting and merging of data strings;

DETAILED DESCRIPTION OF THE PREFERRED EMBODIMENTS

Figure 1:
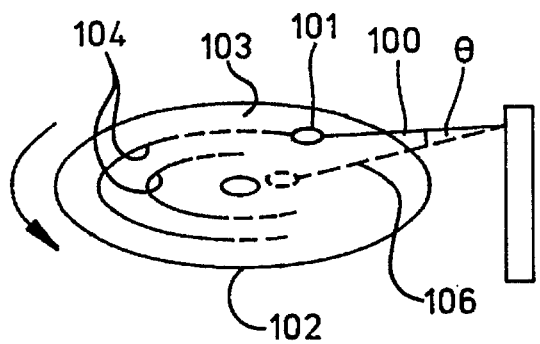
FIG. 1 is a diagram illustrating the components of a typical media drive.
Figure 2:
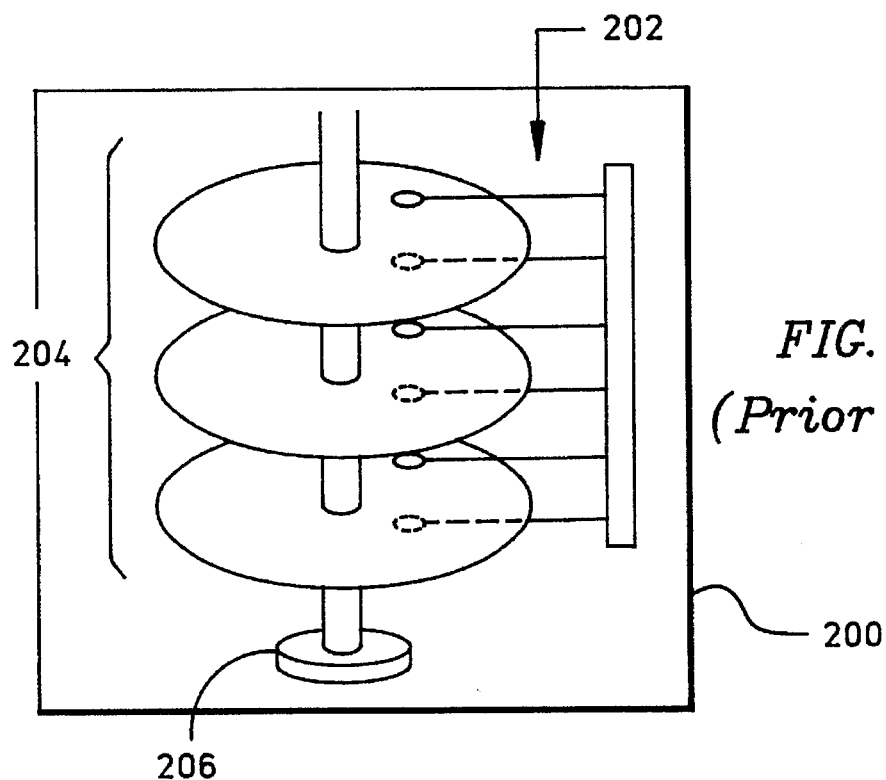
FIG. 2 is a diagram illustrating a typical vertically stacked DASD array 200.
Figure 3:
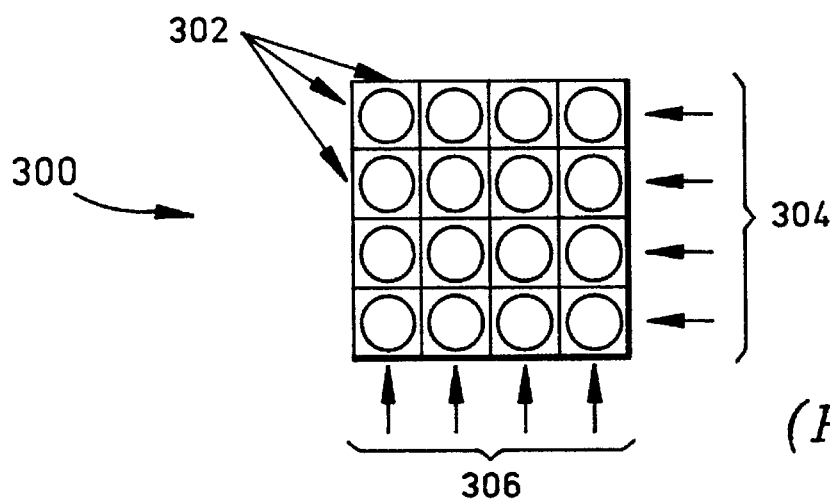
FIG. 3 is a diagram illustrating a typical RAID configuration 300.
Figure 5:
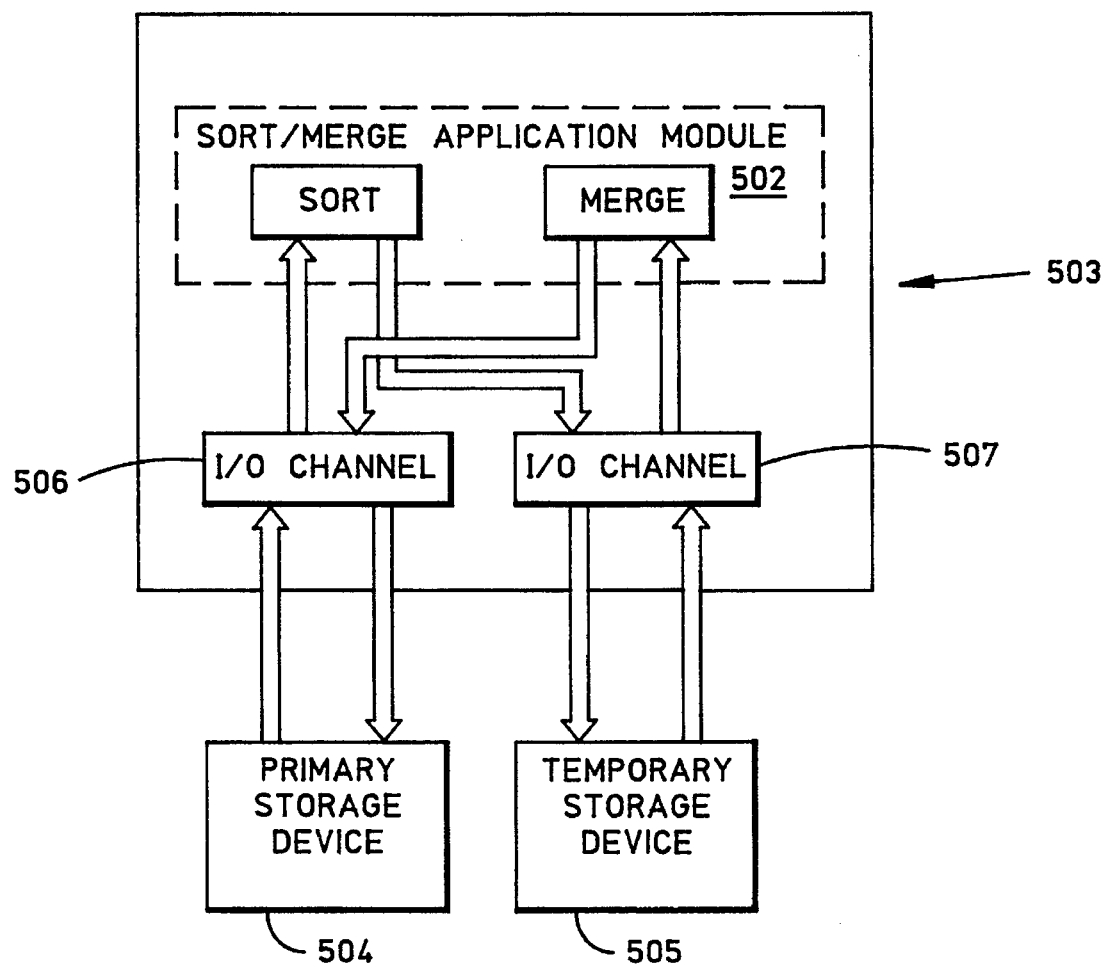
FIG. 5 is a block diagram of one hardware architecture used to conduct sorting and merging operations of the invention.
Figure 6:
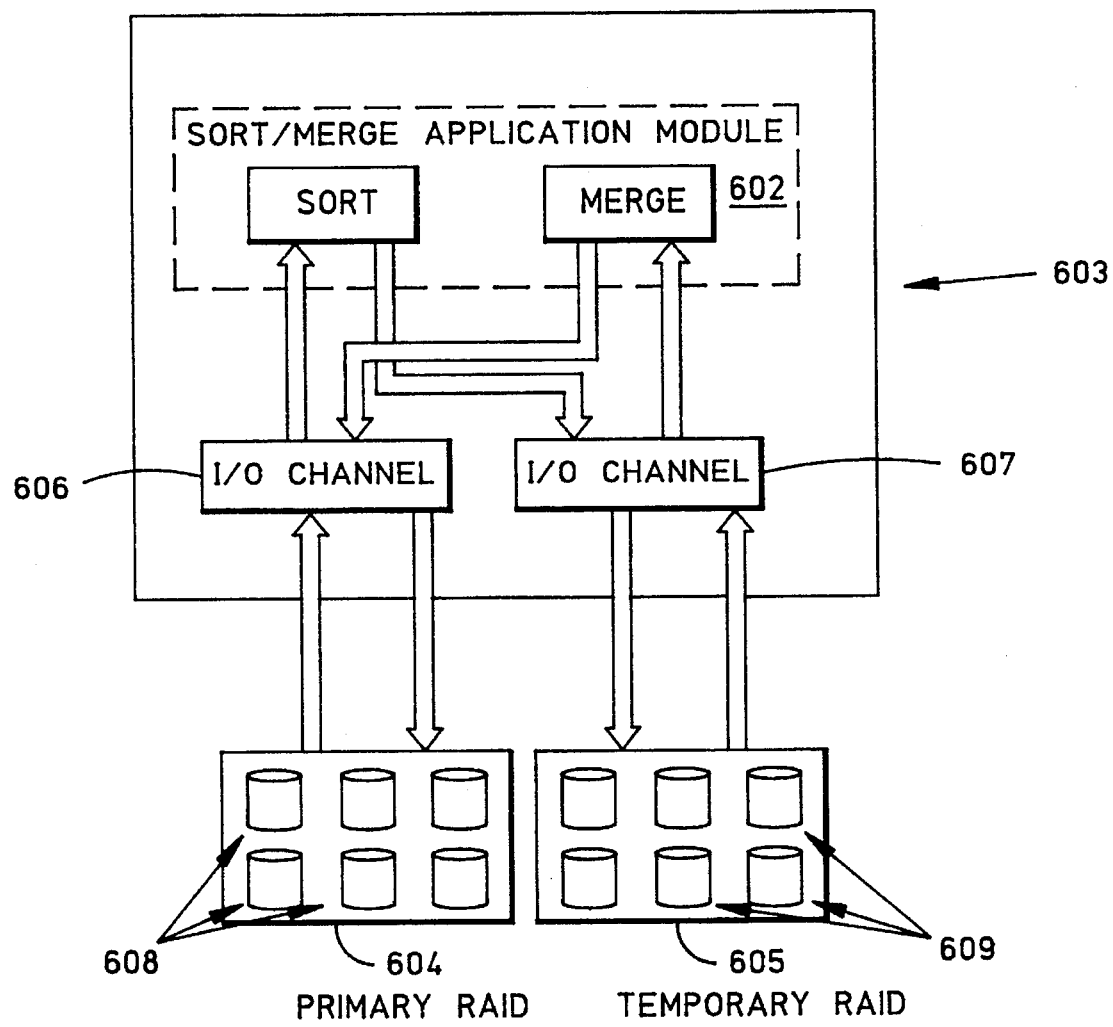
FIG. 6 is a block diagram of an improved hardware architecture used to conduct sorting and merging operations in accordance with the invention.

In accordance with a preferred embodiment of the invention, a scheme for distributing sortwork data on a storage subsystem provides maximal parallelism in accessing the data. In an exemplary embodiment, the invention may be implemented in a hardware arrangement such as depicted in FIG. 6. This embodiment includes a computer system 603, which comprises a sort/merge application module 602 and a pair of I/O channels 606–607. The I/O channels 606–607 serve to actively manage communications between the module 602 and storage subsystems 604–605. In this embodiment, sorting is managed by the sort/merge application module 602. Although the invention may be implemented in a variety of different computing environments, an illustrative embodiment of the computer system 602 contemplates an IBM ES-9000 mainframe computer, with IBM System 390 I/O channels. The computer system 603 may operate, for example, under the VM or MVS operating systems.

Each storage subsystem 604–605 includes multiple DASD units 608–609. To achieve the most efficiency with the invention, as described in greater detail below, each DASD unit 608–609 preferably comprises a multiple disk array such as vertically stacked DASD array. For ease of understanding, then, DASD units 608–609 in the following description of the invention are assumed to contain multiple disks in a stacked vertical array. A discussion of the single-disk embodiment is provided hereinbelow, under a separate heading. The storage subsystems 604–605 preferably comprise primary and temporary RAID devices 604–605, which are preferably configured in the RAID-5 style, which is well known in the art of computer data storage. The RAID devices 604–605 may also include other devices (not shown), such as a data storage area, device controllers, and the like.

Figure 7:
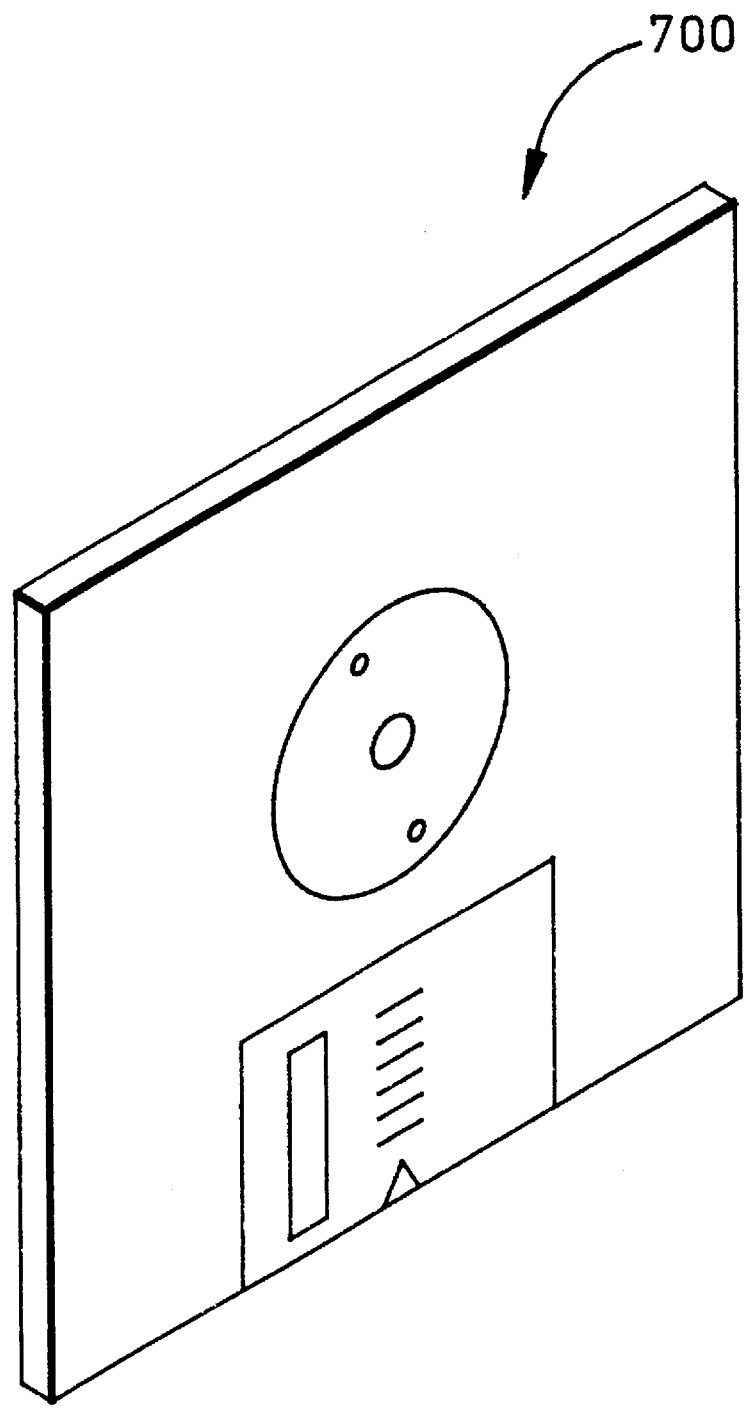
FIG. 7 is a diagram of a computer-readable diskette 700 for use in accordance with the present invention.

In one embodiment of the invention, the module 602 may conduct sorting and merging operations by executing a series of computer-executable instructions. These instructions may reside, for example, in fast-access memory (not shown) of the computer system 603. Alternatively, the instructions may be contained on a data storage medium, such as a computer diskette 700 (FIG. 7). Or, the instructions may also be stored on a DASD array, magnetic tape, conventional "hard drive", electronic read-only memory, optical storage device, paper "punch" cards, or another data storage device. In an illustrative embodiment of the invention, the computer-executable instructions may comprise lines of IBM System 390 Assembly Code.

All disks in the RAID devices 604–605 are assumed to be identical, except for data content. Thus, each disk has the same speed; moreover, all actuators of a DASD unit 608 have the same angular offset at any one time. In describing the operation of the invention, a "logical block" refers to a specific block-sized storage location distributed among all DASD units. Particularly, a logical block includes disk-blocks from correspondingly-positioned disks of each different DASD unit. For example, one logical block may include some or all of track number one of the first disk of each DASD unit. Each logical block is identified by a numerical logical block number ("LBN"). The size of a disk-block may be chosen, in accordance with the present invention, to occupy a portion of a track, or even an entire track. Thus, each track may contain one or more disk-blocks. "Logical array cylinder" ("LAC") refers to the aggregate of all DASD units' tracks having a given radius. For example, an exemplary logical array cylinder may be made up of all data on track number one on each disk of each DASD unit.

IMPROVED DATA STORAGE ARRANGEMENT

In accordance with the present invention, the inventors have discovered that parallelism during merge operations can be increased by altering the way data is stored in the storage subsystem 605 after sorting (prior to merging). Basically, this increase in parallelism is achieved by sequentially shifting the LBN as the sorted data is striped across the DASD units. The distribution resulting from this technique is depicted in Table 3 (below).

TABLE 3

| | LAC 0 | | | |
|---|---|---|---|---|
| | LBN 0 | LBN 1 | LBN 2 | LBN 3 |
| DASD unit 0 | B(0,0) | B(3,1) | B(2,2) | B(1,3) |
| DASD unit 1 | B(1,0) | B(0,1) | B(3,2) | B(2,3) |
| DASD unit 2 | B(2,0) | B(1,1) | B(0,2) | B(3,3) |
| DASD unit 3 | B(3,0) | B(2,0) | B(1,2) | B(0,3) |

This technique is accomplished, in the preferred embodiment, by observing the following procedures:
1. Each logical block is distributed across identically-positioned disks from each of the DASD units 609. For example, LBN 0 may be stored on track number one of the first disk of each DASD unit 609. Therefore, a single LBN contains a corresponding data block from each string. For example, LBN 0 contains the 0th block of strings 0, 1, 2, and 3.
2. All data is stored in a single logical array cylinder. Hence, in a single DASD unit, each LBN corresponds uniquely to a single disk. The position of LBNs 0 through 4 contained on DASD unit 0, for example, are contained on disk numbers 1, 2, 3, and of DASD unit 0, respectively.
3. Each string is stored to achieve diagonal striping across the DASD units. As shown in Table 3, for example, the 0th string is stored in locations that are diagonally connected: (DASD unit 0, LBN 0), (DASD unit 1, LBN 1), (DASD unit 2, LBN 2), (DASD unit 2, LBN 2). The other strings, numbers 1–2, are also stored diagonally, with "wrap-around" as needed. Specifically, when the last LBN or DASD unit is encountered during diagonal striping, the next string-block is stored in the first logical block or DASD unit, as if the borders of the logical array cylinder "wrapped around" to meet each other.

For a number of reasons, this technique represents a significant improvement over previous arrangements, such as that of Table 2. First, each string is distributed across all four DASD units, and therefore 4-way parallelism is maintained in writing the string. Moreover, 4-way parallelism will be achieved during the merge phase, since corresponding blocks of each string can be read simultaneously. For example, the 1st block of strings 0–3 can easily be read at one time by simultaneously reading LBN 0 of disks 0–3. Hence, the overall speed of reading and writing to the disk array is increased.

Also, an important feature of this arrangement is that all data is stored in a single LAC. Accordingly, in each DASD unit 609, the actuator of each disk is positioned to the same track. Therefore, the speed of reading and writing data to the disks is increased since no mechanical movement of the actuators is required.

DATA STORAGE METHOD

Figure 8:
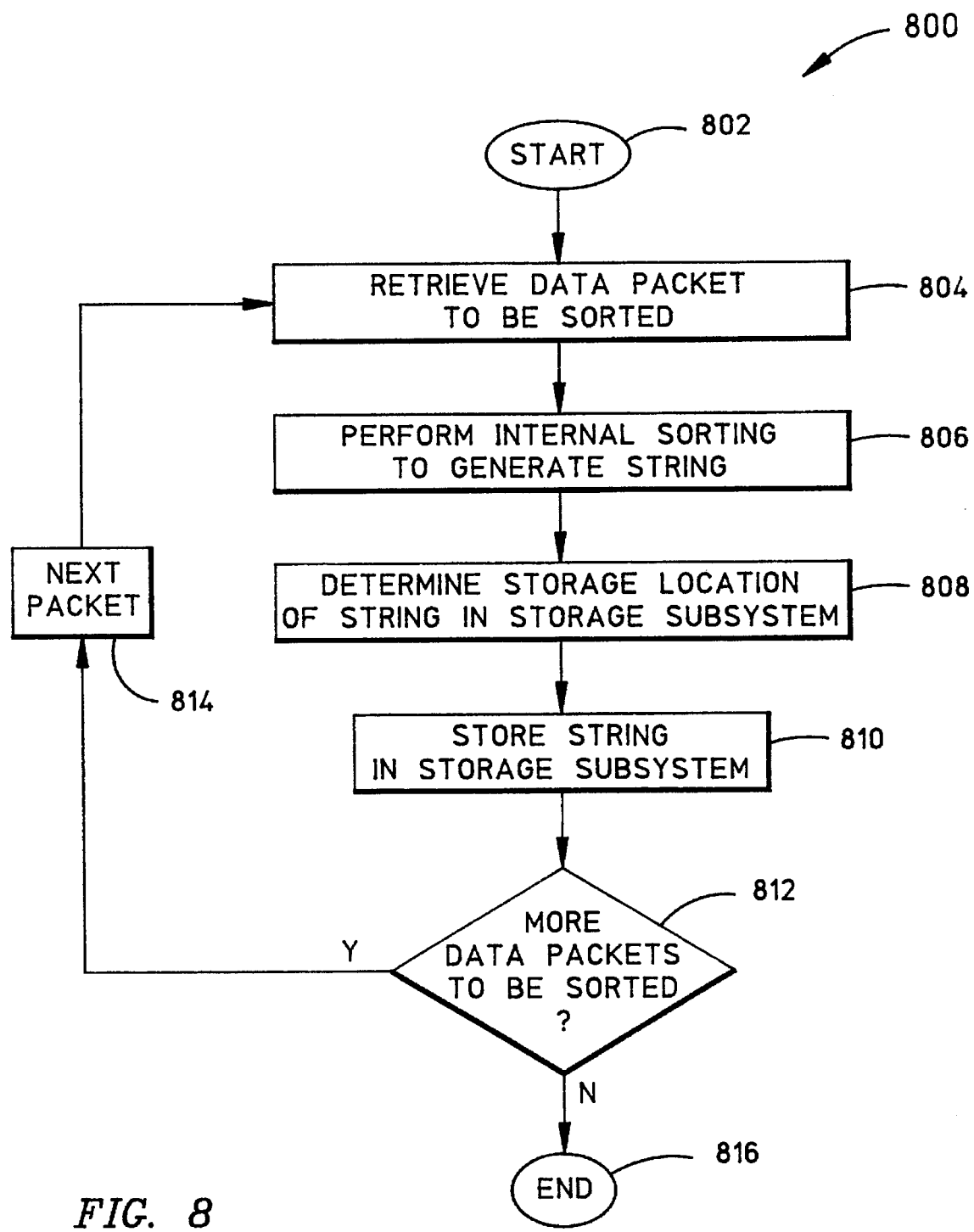
FIG. 8 is a flowchart illustrating the steps involved in sorting and merging conducted in accordance with a preferred embodiment of the invention.

To achieve an improved string distribution such as that of Table 3, an illustrative embodiment of the method of the invention may be implemented by performing the routine shown in FIG. 8. This routine may be carried out by executing a sequence of computer instructions (not shown), which may be written in IBM System 390 Assembly Code, for example. Preferably, the tasks 800 are executed by the computer system 603. After the routine is started in task 802, task 804 retrieves a data packet to be sorted. The data packets to be sorted may be contained, for example, in the primary RAID device 604.

After a data packet is retrieved, task 806 internally sorts the data packet to generate a sorted string. Task 808 then determines where the string should be stored in the temporary RAID device 605. For ease of explanation, this task is explained in greater detail hereinbelow. Next, task 810 stores the string in the location found by task 808.

Query 812 then determines whether there are more data packets to sort. If so, tasks 814 and 804 select and retrieve the next data packet for sorting. When all data packets have been sorted, the routine ends in task 816. After completion of the tasks 800, the computer system 603 proceeds to merge the sorted strings and store the final result on the primary RAID device 604. Merging may be accomplished by any of a number of well known techniques.

The routine shown in FIG. 8 may also be illustrated using pseudo code, as shown in Table 4 (below).

TABLE 4

```
Sort Merge (Input file, Output file)
      -while (not end-of-input data packet)
            -fetch next input data packets
            -sort data packets to generate string           [i]
with j data blocks
            -for (every string-block [i,j])
            call subrtn (i,j) to determine disk
            location LAC (L,d,b)
            Write string block [i,j] to LAC         (L,d,b)
      end;
end;
```

IDENTIFYING A STRING'S STORAGE LOCATION

In the routine explained above, task 808 determined where to store the sorted string in the temporary RAID device 605. To perform this step most advantageously, strings should be diagonally striped with "wrap-around" if necessary, and each logical block should contain corresponding string-blocks of each string, as explained above.

These features may be implemented, in a preferred embodiment, with the following technique. First, the following variables are defined:

n=number of disks in the disk array.
m=number of disk-blocks in one cylinder.
S=number of string-blocks in a single string.

i=string number (e.g. i=0,1,2. . . ).
j=data block.
L=LAC number.
b=LBN within a cylinder.
d=disk index within the disk array, i.e. number of disk.
LAC=entry (d,b) in LAC number L.
B(i,j)=data block j in string number i.
OFFSET=INT(i/n)×S (the offset of string i within the disk array)

Having established these definitions, the location of any string-block is given by the Equations 1–3 (below):

$$L = INT((OFFSET+j)/m) \quad [1]$$

$$d = (i+j) MOD\ m \quad [2]$$

$$b = (OFFSET+j) MOD\ m \quad [3]$$

In Equations 1–3, the function "INT" finds the integer value of its operand, and "MOD" serves to produce the remainder of its operand. The task of determining the storage location of a string-block, as shown by the Equations 1–3, may be implemented using the pseudo code shown in Table 5 (below).

TABLE 5

Subrtn (i,j)
    -query device characteristics of disk array system which include:
        -n, number of devices in disk array
        -m, number of disk blocks per cylinder
        -B, disk block size
    -calculate number of string blocks in a single string
where
        -s = available memory/B
    -calculate OFFSET = INT (i/n) * S
    -calculate LAC number L = INT (OFFSET + j)/m)
    -calculate d = (i + j) MOD m
    -calculate b = (OFFSET + j)MOD m
return LAC (L,d,b);

ANOTHER EXAMPLE

Having described one embodiment of the method of the invention, another example will be given, where there are four DASD units, four disk-blocks in one LAC, four strings, and four string-blocks in a string. Hence:
m=4
n=4
S=8
number of strings=4
The distribution of the string-blocks in accordance with Equations 1–3 is illustrated by Table 6 (below).

Table 6 shows an example of how diagonal striping is conducted when there are more string-blocks in each string than there are logical blocks in a DASD unit. Each logical block is located on identical tracks of identically-positioned disks of different DASD units. This manner of diagonal striping is therefore employed when there are more string-blocks in each string than there are disks in a DASD unit. As shown by Table 6, when the striping of a string includes the last logical block of a DASD unit, striping of that string is continued on the first logical block of the next LAC. Although not shown by Table 6, further LACs may be used, as needed, to accommodate strings with a greater number of string-blocks.

DATA RATE ANALYSIS

"Data rate" is generally used to describe the speed of memory access. To analyze and compare the simple storage scheme (e.g. Table 2) and the storage scheme of the present invention, it is helpful to study each scheme's data rate.

For this analysis, it is assumed that one time unit is required to read or write one string-block. However, only one time unit is required to read or write n blocks to n different DASD units on the same LAC. This is called "n-way" parallelism.

Using the variable definitions set forth above, an example will be discussed where there are four DASD units, from disk-blocks in one LAC, four strings, and four string-blocks in a string. Hence:
m=4
n=4
S=4
number of strings=4

The example of Table 2 (above) provides a data rate of 1.6 string-blocks per unit of time. In this example, each string was interleaved across all DASD units in a single logical block. Four time units are needed to write the strings to the disk storage subsystem, i.e. one time unit for each string. However, 16 time units are required to read all four strings while examining corresponding blocks of each string, as performed in the merge phase of sorting operations. Together, the total is 20 time units. Reading 32 string-blocks in 20 time units yields a data rate of 1.6.

The example of Table 3 (above) provides a data rate of four string-blocks per unit of time. In this example, each string was diagonally interleaved across all DASD units. Four time units are needed to write the strings to the disk array, i.e. one time unit for each string. Unlike the previous example, only four time units are required to read all four strings. This is because corresponding portions of each string are stored in the same logical block. Together, the total

TABLE 6

| | LAC 0 | | | | LAC 1 | | | |
|---|---|---|---|---|---|---|---|---|
| | LBN 0 | LBN 1 | LBN 2 | LBN 3 | LBN 0 | LBN 1 | LBN 2 | LBN 3 |
| DASD unit 0 | B(0,0) | B(3,1) | B(2,2) | B(1,3) | B(0,4) | B(3,5) | B(2,6) | B(1,7) |
| DASD unit 1 | B(1,0) | B(0,1) | B(3,2) | B(2,3) | B(1,4) | B(0,5) | B(3,6) | B(2,7) |
| DASD unit 2 | B(2,0) | B(1,1) | B(0,2) | B(3,3) | B(2,4) | B(1,5) | B(0,6) | B(3,7) |
| DASD unit 3 | B(3,0) | B(2,1) | B(1,2) | B(0,3) | B(3,4) | B(2,5) | B(1,6) | B(0,7) | time required is 8 units. Reading 32 string-blocks in 8 time units yields a data rate of four.

This is an example of 4-way parallelism. Since there were 16 string-blocks, there were 32 operations to be performed, i.e. 16 reads and 16 writes. The maximum data rate possible was 8 time units—the number of operations (32) divided by the number of disks (4).

SINGLE-DISK EMBODIMENT

In contrast to the embodiment discussed above, the present invention may also be implemented with single-disk DASD units. In particular, each DASD unit 609 in this embodiment includes a single disk. In this arrangement, each logical block is still striped across the DASD units. However, all logical blocks are no longer part of the same LAC; rather, each logical block is its own LAC. Table 7 (below) illustrates a sample distribution, corresponding to the distribution of Table 3.

TABLE 7

|  | LBN 0 (LAC 0) | LBN 1 (LAC 1) | LBN 2 (LAC 2) | LBN 3 (LAC 3) |
|---|---|---|---|---|
| DASD unit 0 (single disk) | B(0,0) | B(3,1) | B(2,2) | B(1,3) |
| DASD unit 1 (single disk) | B(1,0) | B(0,1) | B(3,2) | B(2,3) |
| DASD unit 2 (single disk) | B(2,0) | B(1,1) | B(0,2) | B(3,3) |
| DASD unit 3 (single disk) | B(3,0) | B(2,1) | B(1,2) | B(0,3) |

Since this embodiment uses single-disk DASD units, portions of different logical blocks stored on one disk must be located on different tracks. As an example, LBN 0 may comprise the aggregate of all data on the first track of each disk, with LBN 1 being made up of all track number two data, etc. In this embodiment, like the multi-disk DASD unit embodiment described above, diagonal striping is accomplished by sequentially storing successive disk-blocks while incrementing the LBN. However, in the present embodiment, incrementing the LBN also involves advancing to a different track, i.e., a different LAC. As a result, some mechanical movement of the actuators is needed to diagonally stripe data strings across the disks. However, corresponding string-blocks of the different strings (e.g. corresponding string-blocks of strings 0–4) can still be read from the RAID device 605 simultaneously, and without any actuator movement.

While there have been shown what are presently considered to be preferred embodiments of the invention, it will be apparent to those skilled in the art that various changes and modifications can be made herein without departing from the scope of the invention as defined by the appended claims.

What is claimed is:

1. A method for storing and retrieving sorted strings in an array of DASD units to improve parallelism during subsequent merge operations, each DASD unit comprising multiple disks configured with at least one track where each disk of a DASD unit corresponds to one disk of each of the other DASD units, wherein a logical block comprises an aggregate of identically-sized locations from identically-positioned tracks of corresponding disks from each DASD unit, and wherein all identically-positioned tracks of all disks together from a logical array cylinder, said method comprising the steps of:

receiving multiple data strings from a computing system, each string being divisible into a number of ordered string-blocks;

storing the strings in the DASD array by striping catch string evenly across all of the DASD units, such that each logical block contains one string-block from each string and each string-block within a logical block has the same order relative to its string as the other string-blocks to their corresponding strings; and for each one of at least one predetermined logical block, simultaneously reading all string-blocks within the predetermined logical block.

2. The method of claim 1, wherein each string is striped a ross the DADS units in a diagonal pattern.

3. The method of claim 2, wherein the diagonal pattern comprises a wrap-around diagonal pattern.

4. The method of claim 1, wherein the strings are stored in a single logical array cylinder.

5. The method of claim 1, wherein the strings are stored in multiple logical array cylinders.

6. The method of claim 1, wherein each DASD unit comprises a vertically-stacked array of multiple disks.

7. The method of claim 6, wherein each logical block comprises an aggregate of identically-positioned tracks of similarly positioned disks from each DASD unit.

8. The method of claim 1, further comprising steps of reading the stored strings, merging the read strings, and storing the merged strings in a storage device.

9. The method of claim 4, wherein each disk is associated with at least one actuator, and the step of storing is performed while maintaining all of said actuators in fixed positions.

10. A method for storing and retrieving strings in an array of DASD units to improve parallelism during subsequent merge operations, each DASD unit comprising a single disk configured with at least one track, wherein a logical block comprises an aggregate of identically-sized locations from identically-positioned tracks of each disk, said method comprising the steps of:

receiving a number of data strings from a computing system, each string being divisible into a number of ordered string-blocks:

storing the strings in the DASD array by striping each string evenly across all of the disks, such that each logical block contains one string-block from each string and each string-block within a logical block has the same order relative to its string as the other string-blocks to their corresponding strings; and for each one of at least one predetermined logical block, simultaneously reading all string-blocks within the predetermined logical block.

11. A method for distributing sortwork onto an array of DASD units and retrieving data therefrom to improve parallelism during subsequent merge operations, wherein each string is divisible into a number of ordered string-blocks, each DASD unit including multiple disks each sub-divided into at least one track, wherein a logical block comprises an aggregate of identically-sized locations from identically-positioned tracks of corresponding disks from each DASD unit, and wherein identically-positioned tracks from all disks together form a logical array cylinder, said method comprising the steps of:

retrieving data from a storage device and sorting the data according to pre-determined criteria to generate strings;

sequentially storing the strings in the DASD array such that each string is evenly striped across all of the DASD units after all data has been sorted and stored in the DASD array, such that each logical block contains one string-block from each string, each string-block within a logical block having the same order relative to its string as the other string-blocks to their corresponding strings; and for each one of at least one predetermined logical block, simultaneously reading all string-blocks within the predetermined logical block.

12. An electronic sorting apparatus, comprising:

a storage subsystem including multiple DASD units with synchronized access, each DASD unit including multiple disks, wherein each disk of a DASD unit corresponds to one disk of each of the other DASD units, and wherein each disk is subdivided into a number of tracks corresponding to identically-positioned tracks of the other disks, wherein a logical block comprises an aggregate of identically-sized locations from identically-positioned tracks of corresponding disks from each DASD unit: and a computer system interfaced to the storage subsystem, including a sort/merge application module programmed to perform method steps comprising:

systematically retrieving data from a storage device and sorting the data to generate strings, each string being divisible into an identical number of ordered string-blocks;

storing the strings in the storage subsystem such that, after all strings have been stored, each string is evenly striped across all of the DASD units, and each logical block contains one string-block from each string, wherein each string-block within a logical block has the same order relative to its string as the other string-blocks to their corresponding strings; and for each one of at least one predetermined logical block, simultaneously reading all string-blocks within the predetermined logical block.

13. The apparatus of claim 12, wherein the module is programmed to stripe each string across the DASD units in a diagonal pattern.

14. The apparatus of claim 13, wherein the diagonal pattern comprises a wrap-around diagonal pattern.

15. The apparatus of claim 12, wherein identically-positioned tracks from all disks together form a logical array cylinder, and the module programmed to stripe the strings across a single logical array cylinder.

16. The apparatus of claim 12, wherein identically-positioned tracks from all disks together form a logical array cylinder, and the module is programmed to stripe the strings across multiple logical array cylinders.

17. The apparatus of claim 12, wherein each DASD unit comprises a vertically-stacked array of multiple disks.

18. The apparatus of claim 17, wherein each logical block comprises an aggregate of identically-positioned tracks of similarly positioned disks from each DASD unit.

19. The apparatus of claim 12, wherein the module is further programmed to perform method steps comprising reading the stored strings, merging the read strings, and storing the merged strings in a storage device.

20. The apparatus of claim 15, wherein each disk is associated with at least one actuator, and the module is programmed to perform the step of storing while maintaining all of said actuators in fixed positions.

21. An electronic sorting apparatus, comprising:

a storage subsystem including multiple DASD units with synchronized access, each DASD unit including a single disk sub-divided into a number of tracks corresponding to identically-positioned tracks of the other disks, wherein a logical block comprises an aggregate of identically-sized locations from identically-positioned tracks of each disk; and a computer system interfaced to the storage subsystem, including a sort/merge application module programmed, to perform method steps comprising:

systematically retrieving data from a storage device and sorting the data to generate strings, each string being divisible into an identical number of ordered string-blocks;

storing the strings in the storage subsystem such that, after all strings have been stored, each string is evenly striped across all of the disks, and each logical block contains one string-block from each string, wherein each string-block within a logical block has the same order relative to its string as the other string-blocks to their corresponding strings; and strings.

for each one of at least one predetermined logical block, simultaneously reading all string-blocks within the predetermined logical block.

22. A machine-readable program data storage device tangibly embodying a program of instructions executable by the machine to perform method steps to store sortwork data to an array of DASD units, each DASD unit including at least one disk configured with at least one track, wherein a logical block comprises an aggregate of identically sized locations from identically-positioned tracks from each disk, said method steps comprising:

receiving a number of sorted data strings from a computing system, each string being divisible into a number of ordered string-blocks;

storing the strings in the DASD array by striping each string evenly across all disks, such that each logical block contains one string-block from each string, each string-block within a logical block having the same order relative to its string as the other string-blocks to their corresponding strings; and for each one of at least one predetermined logical block, simultaneously reading all string-blocks within the predetermined logical block.

23. The data storage device of claim 22, wherein the step of storing includes steps of striping each string across the DASD units in a diagonal pattern.

24. The data storage device of claim 23, wherein the diagonal pattern comprises a wrap-around diagonal pattern.

25. The data storage device of claim 22, wherein the step of storing includes a step of storing the strings in a single logical array cylinder.

26. The data storage device of claim 22, wherein the step of storing includes a step of storing the strings in multiple logical array cylinders.

27. The data storage device of claim 22, wherein each DASD comprises a vertically-stacked array of multiple disks.

28. The data storage device of claim 27, wherein each logical block comprises an aggregate of identically-positioned tracks of similarly positioned disks from each DASD unit.

29. The data storage device of claim 22, wherein the method steps further comprise the steps of reading the stored strings, merging the read strings, and storing the merged strings in a storage device.

30. The data storage device of claim 25, wherein each disk is associated with at least one actuator, and the step of storing is performed while maintaining all of said actuators in fixed positions.

31. A combination operable in conjunction with a digital processing apparatus to store sortwork data to an array of DASD units, each DASD unit comprising multiple disks configured with at least one track where each disk of a DASD unit corresponds to one disk of each of the other DASD units, wherein a logical block comprises an aggregate of identically-sized locations from identically-positioned tracks of corresponding disks from each DASD unit, said combination comprising:

a data storage medium operable in conjunction with a data storage system of the digital processing apparatus: and a sort/merge application module residing on the data storage medium and executable by the digital processing apparatus to perform method steps comprising:

receiving a number of sorted data strings from a computing system, each string being divisible into a number of ordered string-blocks;

storing the strings in the DASD array by striping each string evenly across all DASD units such that each logical block contains one string-block from each string and each string-block within a logical block has the same order relative to its string as the other string-blocks to their corresponding strings; and each one of at least one predetermined logical block, simultaneously reading all string-blocks within the predetermined logical block.

32. A combination operable in conjunction with a digital processing apparatus to store sortwork data to an array off DASD units, each DASD unit comprising a single disk configured with at least one track, wherein a logical block comprises an aggregate of identically-sized locations from identically-positioned tracks of each disk, said combination comprising:

a data storage medium operable in conjunction with a data storage system of the digital processing apparatus; and a sort/merge application module residing on the data storage medium and executable by the digital processing apparatus to perform method steps comprising:

receiving a number of stored data strings from a computing system, each string being divisible into a number of ordered string-blocks;

storing the strings in the DASD array by striping each string evenly across all disks such that each logical block contains one string-block from each string and each string-block within a logical block has the same order relative to its string as the other string-blocks to their corresponding strings; and for each one of at least one predetermined logical block, simultaneously reading all string blocks within the predetermined logical block.

33. The method of claim 1, further comprising the steps of operating the DASD units to simultaneously read all string-blocks stored in a selected logical block.

34. The method of claim 10, further comprising the steps of operating the DASD units to simultaneously read all string-blocks stored in a selected logical block.

35. The method of claim 11, further comprising the steps of operating the DASD units to simultaneously read all string-blocks stored in a selected logical block.

36. The data storage device of claim 22, further tangibly embodying a program of instructions executable by the machine to perform method steps to read sortwork data from the array of DASD units, said method steps comprising operating the DASD units to simultaneously read all string-blocks stored in a selected logical block.

37. The combination of claim 31, said sort/merge application module further being executable by the digital processing apparatus to perform steps comprising operating the DASD units to simultaneously read all string-blocks stored in a selected logical block.

38. The combination of claim 32, said sort/merge application module further being s executable by the digital processing apparatus to perform steps comprising operating the DASD units to simultaneously read all string-blocks stored in a selected logical block.

* * * * *

UNITED STATES PATENT AND TRADEMARK OFFICE
CERTIFICATE OF CORRECTION

PATENT NO. : 5,613,085
DATED : March 18, 1997
INVENTOR(S) : Lee et al

It is certified that error appears in the above-indentified patent and that said Letters Patent is hereby corrected as shown below:

Column 11, line 66, change "from" to --form--;

Column 12, line 14, change "a ross" to --across--;

Column 14, line 19, delete "strings".

Signed and Sealed this

Fifteenth Day of December, 1998

Attest:

BRUCE LEHMAN

Attesting Officer

Commissioner of Patents and Trademarks